US010591705B2

(12) United States Patent
Sekiguchi

(10) Patent No.: US 10,591,705 B2
(45) Date of Patent: Mar. 17, 2020

(54) LENS DRIVING DEVICE, CAMERA DEVICE AND ELECTRONIC APPARATUS

(71) Applicant: New Shicoh Technology Co., Ltd., Kanagawa (JP)

(72) Inventor: Naoki Sekiguchi, Kanagawa (JP)

(73) Assignee: New Shicoh Technology Co., Ltd., Kanagawa (JP)

( * ) Notice: Subject to any disclaimer, the term of this patent is extended or adjusted under 35 U.S.C. 154(b) by 0 days.

(21) Appl. No.: 16/205,463

(22) Filed: Nov. 30, 2018

(65) Prior Publication Data

US 2019/0101731 A1 Apr. 4, 2019

Related U.S. Application Data

(63) Continuation-in-part of application No. 15/429,283, filed on Feb. 10, 2017, now Pat. No. 10,175,450.

(30) Foreign Application Priority Data

Feb. 17, 2016 (JP) .................. 2016-027741

(51) Int. Cl.
G02B 7/02 (2006.01)
G02B 13/00 (2006.01)
G02B 7/09 (2006.01)
G03B 3/10 (2006.01)
G03B 17/17 (2006.01)

(52) U.S. Cl.
CPC ........... *G02B 13/0065* (2013.01); *G02B 7/09* (2013.01); *G03B 3/10* (2013.01); *G03B 17/17* (2013.01)

(58) Field of Classification Search
CPC ........................................................ G02B 7/04
USPC ........................................................ 359/824
See application file for complete search history.

(56) References Cited

U.S. PATENT DOCUMENTS

2001/0048657 A1 12/2001 Ohtsuka
2010/0110270 A1 5/2010 Sekimoto et al.
2015/0215542 A1* 7/2015 Nomura et al. ... H04N 5/23287
348/208.11

FOREIGN PATENT DOCUMENTS

JP H09-049955 2/1997
JP 2008-076485 4/2008
JP 2010-134409 6/2010

OTHER PUBLICATIONS

Office Action dated Sep. 30, 2019 in corresponding Japanese Application No. 2018-227851 and English Translation.
English language machine translation of JP 2008-076485.
English language machine translation of JP H09-049955.

* cited by examiner

Primary Examiner — James C. Jones
(74) Attorney, Agent, or Firm — Fildes & Outland, P.C.

(57) ABSTRACT

A lens driving device includes: a lens carrier for fixing a lens barrel to the inside thereof; a driving unit for moving the lens carrier along an optical axis direction of the lens barrel; and an elastic supporter for supporting the lens carrier so as to move freely along the optical axis direction of the lens barrel; wherein the lens carrier has an opening which opens toward a direction intersecting the optical axis direction of the lens barrel and through which opening the lens barrel is inserted.

12 Claims, 8 Drawing Sheets

LENS DRIVING DEVICE, CAMERA DEVICE AND ELECTRONIC APPARATUS

CROSS REFERENCE TO RELATED APPLICATIONS

This application is continuation-in-part of U.S. patent application Ser. No. 15/429,283 filed on Feb. 10, 2017, entitled "LENS DRIVING DEVICE, CAMERA DEVICE AND ELECTRONIC APPARATUS", incorporated herein by reference.

TECHNICAL FIELD

This invention relates to a lens driving device, a camera device and an electronic apparatus.

BACKGROUND ART

Electronic apparatuses such as cellular phones and smart phones are equipped with miniaturized cameras. The miniaturized camera of this type is an automatic focusing type. The miniaturized camera of this automatic focusing type includes a lens driving device for actuating the lens barrel to move.

The Japanese Unexamined Patent Application Publication No. 2010-134409A discloses a lens driving device in which a lens barrel is fixed inside a lens carrier and the lens carrier is moved along the optical axis direction of the lens barrel thereby adjusting the focus.

SUMMARY

In the above prior art, a main body is formed with an opening portion which opens toward the optical axis direction of the lens barrel through which opening portion the lens barrel is inserted along the optical axis direction and thereafter the lens barrel is fixed to the lens carrier. The lens barrel is slid and fit into the lens carrier without an aid of threads at the portion between the lens barrel and the lens carrier. Therefore, the above Japanese Unexamined Patent Application Publication No. 2010-134409A explains that the lens driving device can be miniaturized since both the lens barrel and the lens carrier do not need to have any threads.

However, since the lens barrel has to be inserted into the lens carrier in a sliding manner from the optical axis direction, there needs to have a sliding wall for the lens barrel to be slid inside the lens carrier. Therefore, the lens carrier cannot be miniaturized, and it hinders the miniaturization of the lens driving device.

The present invention aims to solve the problem of the prior art, and to provide a lens driving device, camera device and an electronic apparatus which are able to be miniaturized.

In one aspect of the present invention, a lens driving device is provided. The lens driving device includes: a lens carrier for fixing a lens barrel to the inside thereof; a driving unit for moving the lens carrier along an optical axis direction of the lens barrel; and an elastic supporter for supporting the lens carrier so as to move freely along the optical axis direction of the lens barrel; wherein the lens carrier has an opening which opens toward a direction intersecting the optical axis direction of the lens barrel and through which opening the lens barrel is inserted.

Preferably, the lens driving device further includes an optical component arranged on the optical axis direction of the lens barrel, wherein the optical component has a reflect surface for folding a light entered thereto.

Preferably, the optical component has a front surface and a bottom surface, wherein the optical component receives the light from the front surface and reflects the light outward from the bottom surface.

Preferably, the opening opens toward a forward direction.

Preferably, the lens driving device further includes a housing that directly faces the opening.

Preferably, the housing has a cover that directly faces the opening.

Preferably, the lens carrier has another opening on the opposite side of the opening through which another opening the lens barrel can directly face the housing.

Preferably, the cover has a window through which a light enters.

In another aspect of the present invention, a camera device includes: a lens barrel; a lens driving device of the above aspect; and a photo detecting sensor that receives light passed through the lens barrel.

Preferably, the lens driving device further includes an optical component that folds a light entered therethrough and is arranged on the optical axis direction of the lens barrel.

In another aspect of the present invention, an electronic apparatus being equipped with a camera device includes: a lens barrel; a lens driving device of the above aspect; and a photo detecting sensor that receives light passed through the lens barrel.

According to the present invention, since the lens carrier has the opening through which the lens barrel can be inserted from the direction intersecting the optical axis of the lens barrel, the lens carrier can be miniaturized, thus the lens driving device, the camera device and the electronic apparatus can also be miniaturized.

EXEMPLARY EMBODIMENT OF THE INVENTION

An embodiment of the present invention will be described hereinafter with reference to the drawings.

Figure 1:
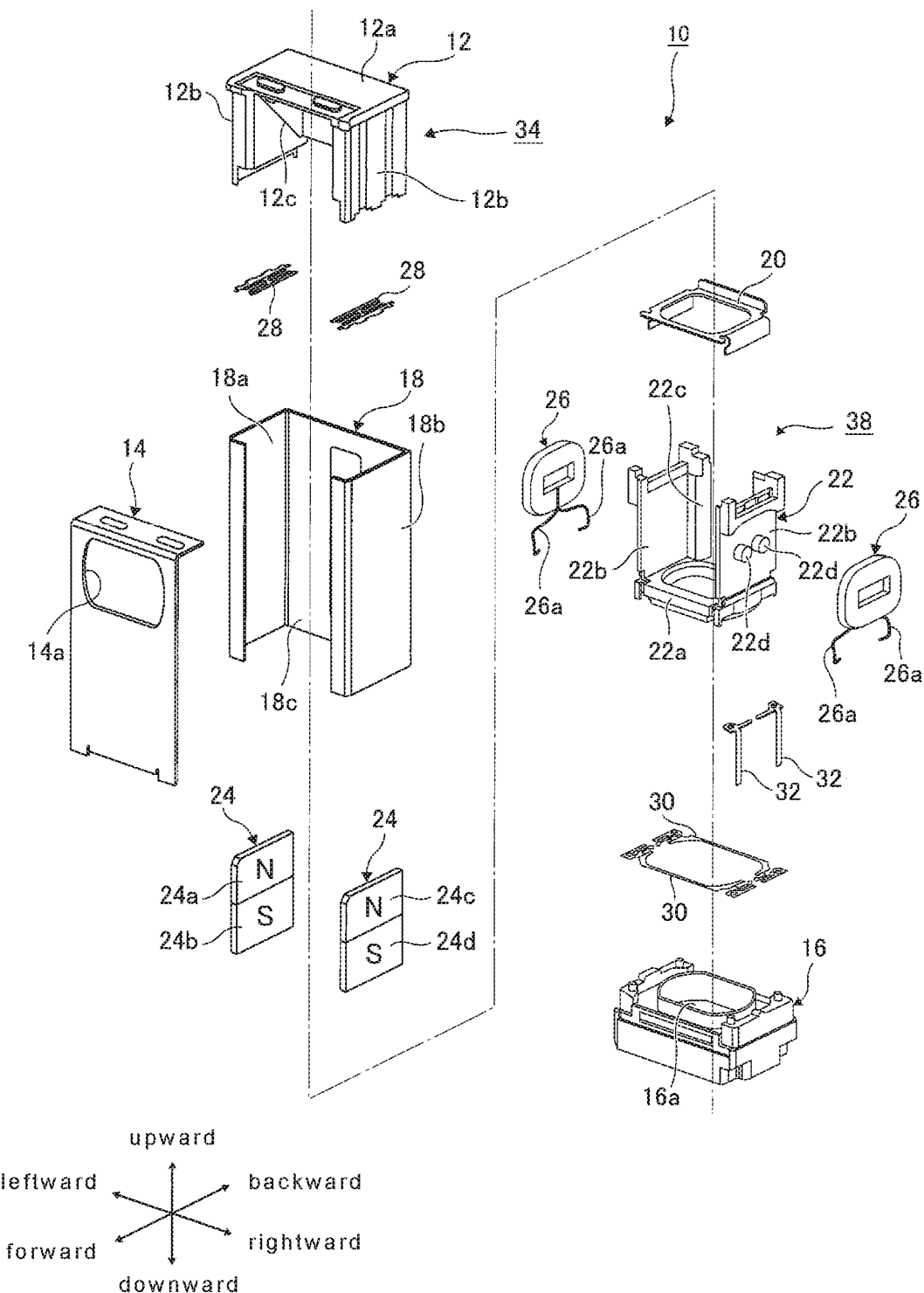
FIG. 1 shows an exploded perspective view of a lens driving device according to an embodiment of the present invention.
Figure 2:
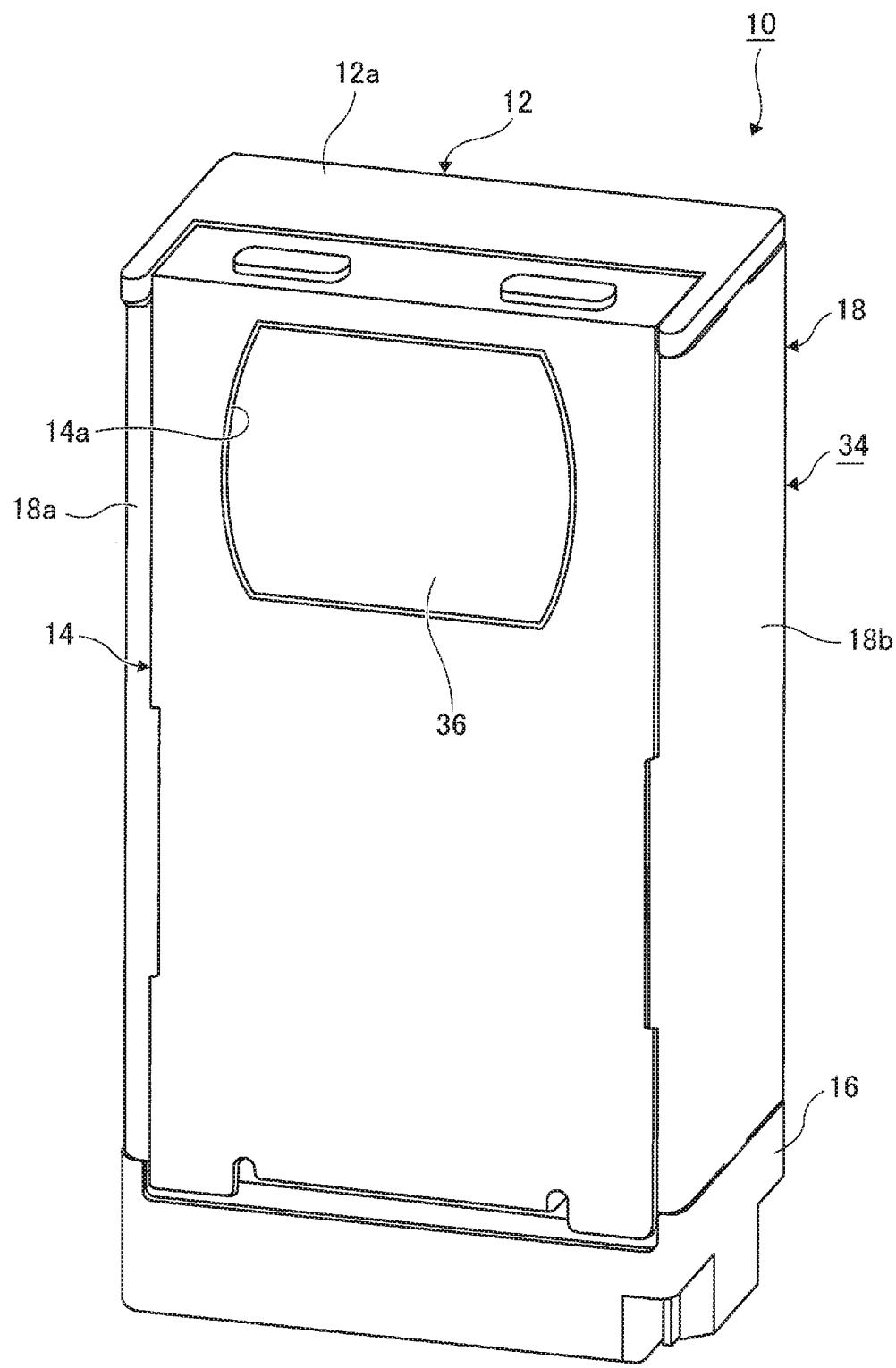
FIG. 2 shows a perspective view of the lens driving device according the embodiment of the present invention.

FIG. 1 shows an exploded perspective view of a lens driving device according to an embodiment of the present invention. The lens driving device 10 includes an upper member 12, a cover member 14, a lower member 16, a yoke 18, a reinforcement member 20, a main body 22 of the lens carrier, magnets 24, coils 26, upper leaf springs 28, lower leaf springs 30 and terminals 32. A main body 22 of the lens carrier is supported by the upper leaf springs 28 and the lower leaf springs 30 which form an elastic supporter for the lens carrier so that the main body 22 of the lens carrier can move freely along the optical axis direction of the lens barrel 40.

In the following description, as shown in FIG. 1, one direction along the optical axis direction of the lens barrel 40 described later is referred to as "upward" direction while the opposing direction thereto is referred to as "downward" direction. The one direction orthogonal to the optical axis direction of the lens barrel 40 is referred to as "forward" direction while the opposing direction thereto is referred to as "backward" direction. Further, the one direction orthogonal to the upward-and-downward direction and the forward-and-backward direction is referred to as "leftward" direction while the opposing direction thereto is referred to as "rightward" direction.

The upper member 12 has a top wall 12a and side walls 12b extending downwardly from the right and left ends and the back end of the top wall 12a. The lateral side walls 12b are formed inside thereof with inclined parts 12c for positioning a prism 36 which is described later.

The cover member 14 is formed with a light entrance window 14a through which the light enters. The lower member 16 is formed as a rectangular parallelepiped shape and is formed at inside thereof with a light exit window 16a through which the light exits. The lower member 16 is installed with an IR filter and an optical sensor when the camera device mentioned below is assembled.

The yoke 18 is formed as a U-shaped member including three walls, i.e. a left side wall 18a, a right side wall 18b and a back side wall 18c which surround an internal space except the front portion. As for the front portion, the distal ends of the left side wall 18a and the right side wall 18b are bent in a manner to be directed toward each other.

A lens driving device housing 34 is composed of the upper member 12, the cover member 14, the lower member 16 and the yoke 18. That is, the lens driving device housing 34 is assembled by the following manner: fitting the upper member 12 into the yoke 18 so that the outer faces of the side walls 12b of the upper member 12 are fit inside the internal faces of the left side wall 18a, right side wall 18b and back side wall 18c; fitting the lower member 16 into the yoke 18 so that the outer faces of the lower member 16 are fit inside the internal faces of the left side wall 18a, right side wall 18b and back side wall 18c; and fitting the cover member 14 into the upper member 12, the lower member 16 and the yoke 18. Thus the lens driving device housing 34 forms a parallelepiped shape having a hollow space inside thereof so as to block up the front face of the yoke 18.

As shown in FIGS. 2 to 5, the prism 36 is fixed inside the upper member 12. The prism 36 is an optical component which forms an optical system bending the optical axis direction and has a triangle cross section. The prism 36 is arranged so that the front face thereof is fit behind the light entrance window 14a of the cover member 14, the both lateral sides of an inclined back surface thereof, or a reflect surface, abut along the inclined parts 12c of the upper member 12 and the lower face directs downward. Thus, the prism 36 receives the light from the front face and thereafter reflects the light at the inclined back surface toward the downward direction.

Figure 6:
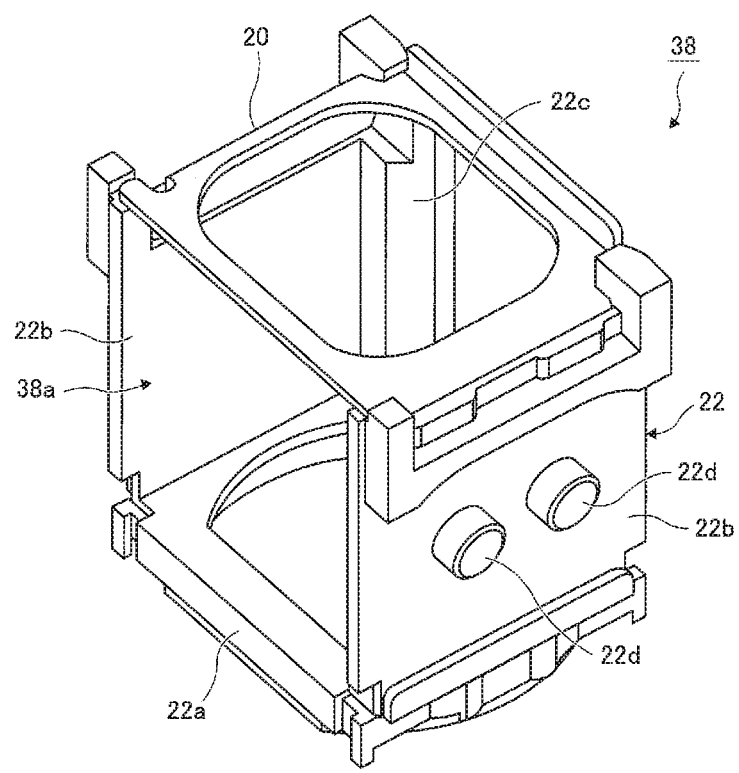
FIG. 6 shows the lens carrier used for the lens driving device according to the embodiment of the present invention.

As best shown in FIG. 6, the reinforcement member 20 and the main body 22 of the lens carrier are assembled together to form the lens carrier 38. The main body 22 of the lens carrier is formed of resin and has a bottom portion 22a having a rectangular frame shape and coil mounting portions 22b extending upwardly from the lateral ends of the bottom portion 22a. The reinforcement member 20 is formed of a metal such as stainless steel and is formed as a rectangular frame shape. The reinforcement member 20 reinforces the main body 22 of the lens carrier by means of the lateral sides thereof being fixed to the upper ends of the coil mounting portions 22b of the main body 22 of the lens carrier from the inside thereof.

Figure 3:
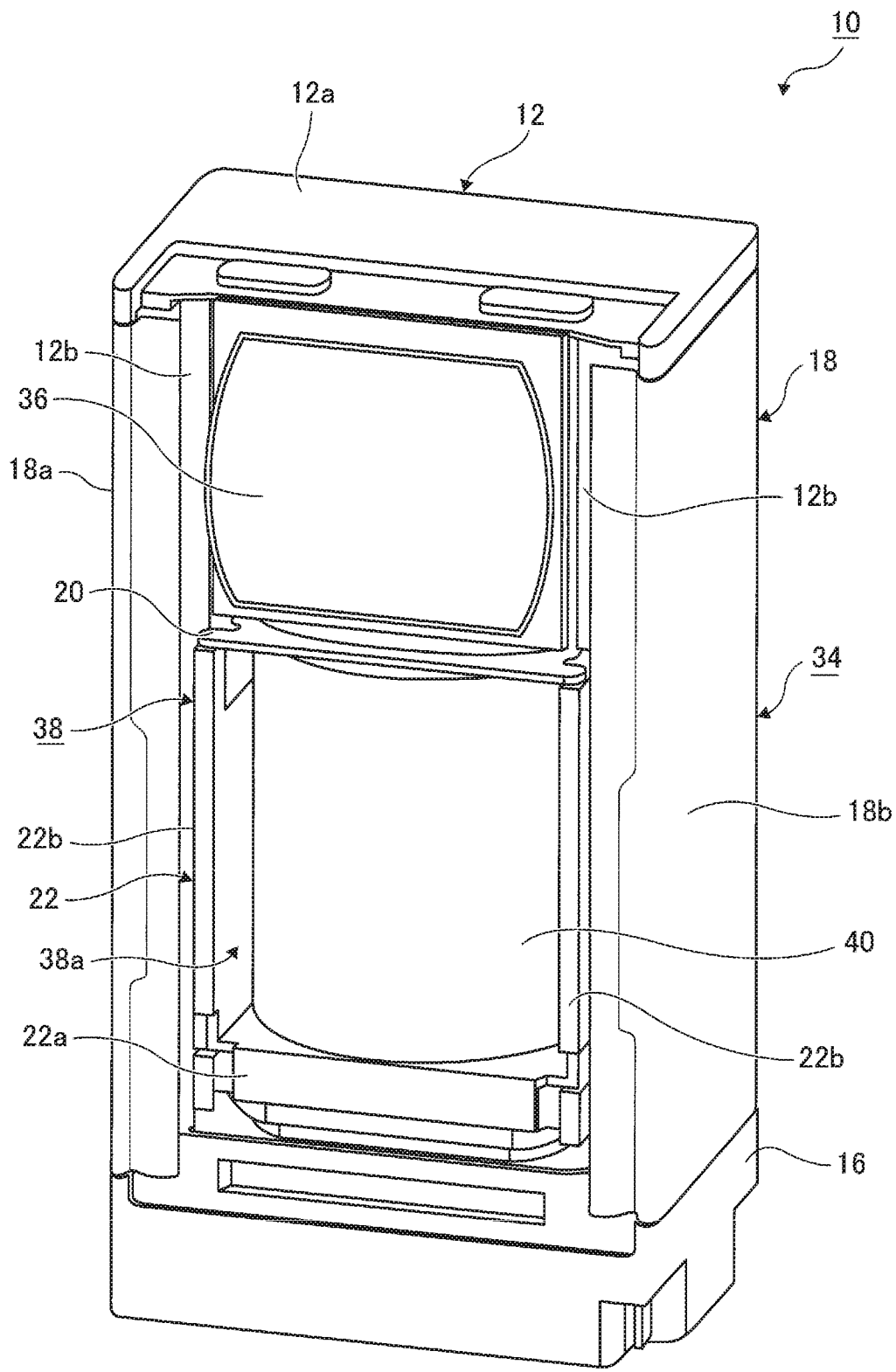
FIG. 3 shows the lens driving device according to the embodiment of the present invention and shows a perspective view of the lens driving device of FIG. 2 in a state a cover member is removed.
Figure 5:
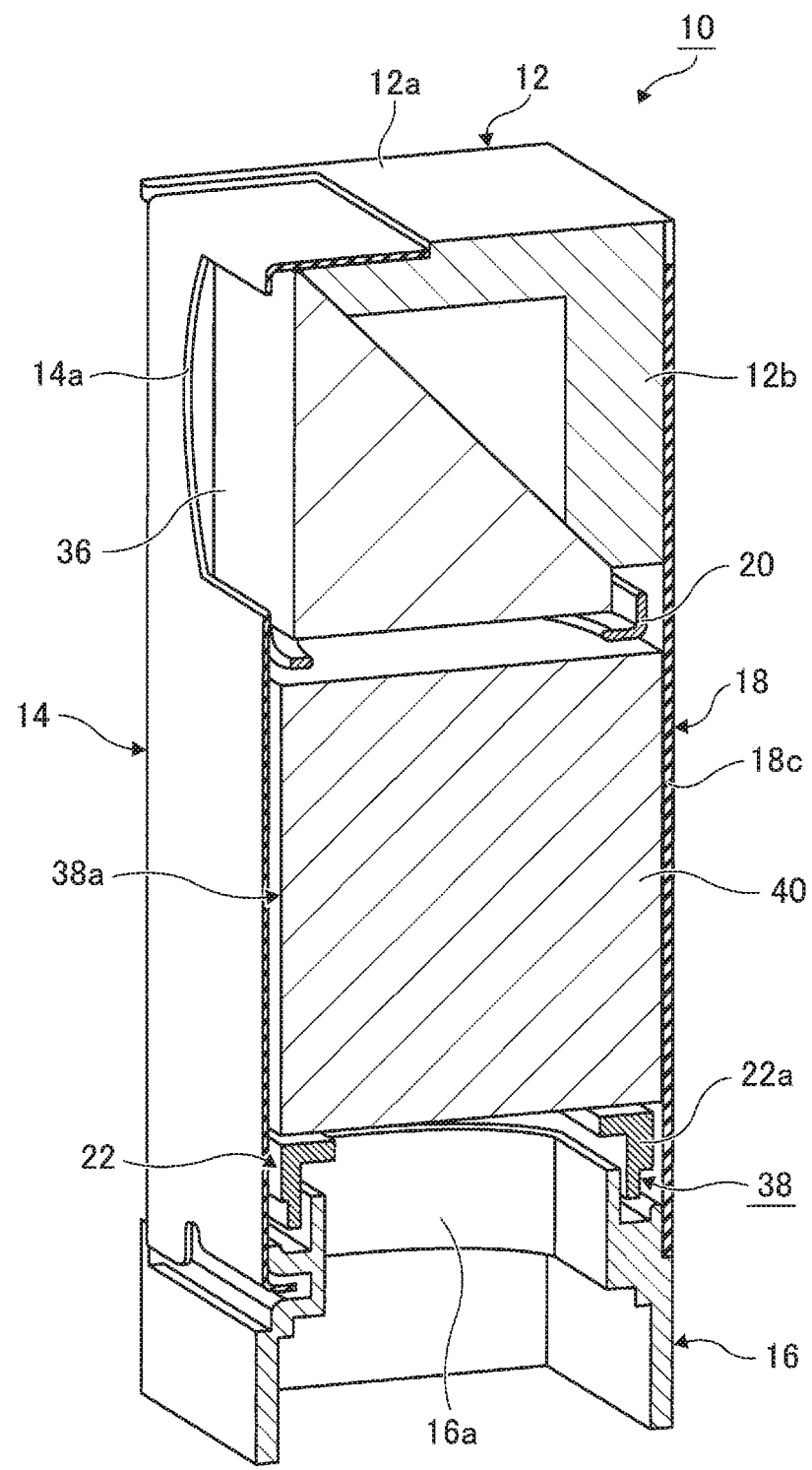
FIG. 5 shows the lens driving device according to the embodiment of the present invention and shows a sectional perspective view cut by a plane which includes the optical axis of the lens barrel and expands in the vertical direction and a front-and-back direction.

The lens carrier 38, as shown in FIGS. 3 and 5, has an opening 38a through which the lens barrel 40 can be inserted. The opening 38a is formed so as to be surrounded by the reinforcement member 20, the bottom portion 22a of the main body 22 of the lens carrier and the coil mounting portions 22b. The opening 38a opens toward the front direction. During the assembly process, as shown in FIG. 3, the lens barrel 40 is inserted through the opening 38a from the front side into the lens carrier 38 previous to the assembly of the cover member 14.

The main body 22 of the lens carrier is formed with abutment surfaces 22c for the lens barrel at the internal surfaces of the back ends of the coil mounting portions 22b thereof. The lens barrel 40 includes a lens, has a cylindrical shape, abuts to the internal surfaces of the coil mounting portions 22b and to the abutment surfaces 22c for the lens barrel, and is fixed to the lens carrier 38 by making use of an adhesive material.

Figure 4:
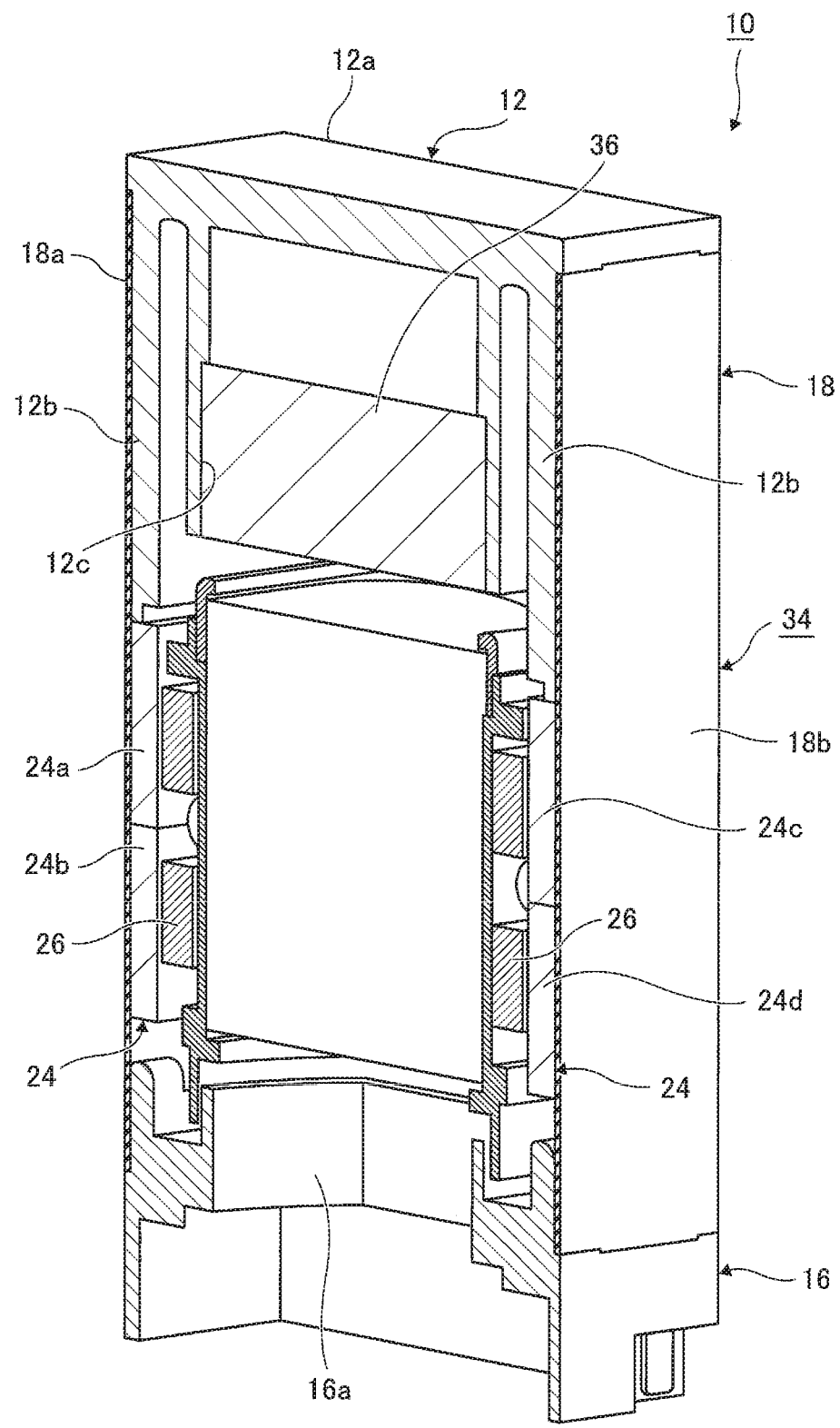
FIG. 4 shows the lens driving device according to the embodiment of the present invention and shows a sectional perspective view cut by a plane which includes the optical axis of the lens barrel and expands in the vertical direction and a right-and-left direction.

As best shown in FIG. 4, the magnets 24 includes four rectangular magnetic pieces 24a, 24b, 24c and 24d. Two magnetic pieces 24a and 24b are arranged adjoining along the upward-and-downward direction each other and are fixed to the internal surface of the left side wall 18a of the yoke 18. The other two magnetic pieces 24c and 24d are also arranged adjoining along the upward-and-downward direction each other and are fixed to the internal surface of the right side wall 18b of the yoke 18 in a manner to be aligned with the magnetic pieces 24a and 24b with respect to the upward-and-downward direction. Each of the magnetic pieces 24a, 24b, 24c and 24d is magnetized so that the outer surface and the inner surface thereof have the different magnetic polarities. Further, each adjoining inner surface and each opposing inner surface of the magnetic pieces 24a, 24b. 24c and 24d exhibits different magnetic pole each other. For example, if the inner surface of the magnetic piece 24a is the N-pole, the inner surfaces of the magnetic pieces 24b and 24c are the S-pole while the inner surface of the magnetic piece 24d is the N-pole. It is possible that the magnetic pieces 24a and 24b, as well as the magnetic pieces 24c and 24d, can be integrally formed, respectively. In that case, the magnetic pieces can be magnetized so that the inner surface of the magnetic piece 24a (24c) and the inner surface of the magnetic piece 24b (24d) exhibit different magnetic polarities.

As shown in FIG. 6, the each coil mounting portion 22b of the main body 22 of the lens carrier is formed with two positioning projections 22d projecting outwardly in a manner that they are aligned each other in the forward-and-backward direction.

The each coil 26 is formed to have a shape including two linear parts and semicircular parts connected to the both ends of the each linear part. The coil 26 has an air core for positioning around the positioning projections 22d and is positioned thereto by fitting around the positioning projections 22d thereby being fixed to the lens carrier 38 by making use of an adhesive material. The linear parts of the coils 26 are confronted to the magnetic pieces 24a to 24d of the magnets 24. Since electric current flows through the linear parts of the each coil 26 in the forward-and-backward direction and magnetic flux is produced toward the leftward-and-rightward direction of the each coil 26; therefore, an electromagnetic force toward the upward-and-downward direction is applied to the lens carrier 38.

Figure 7:
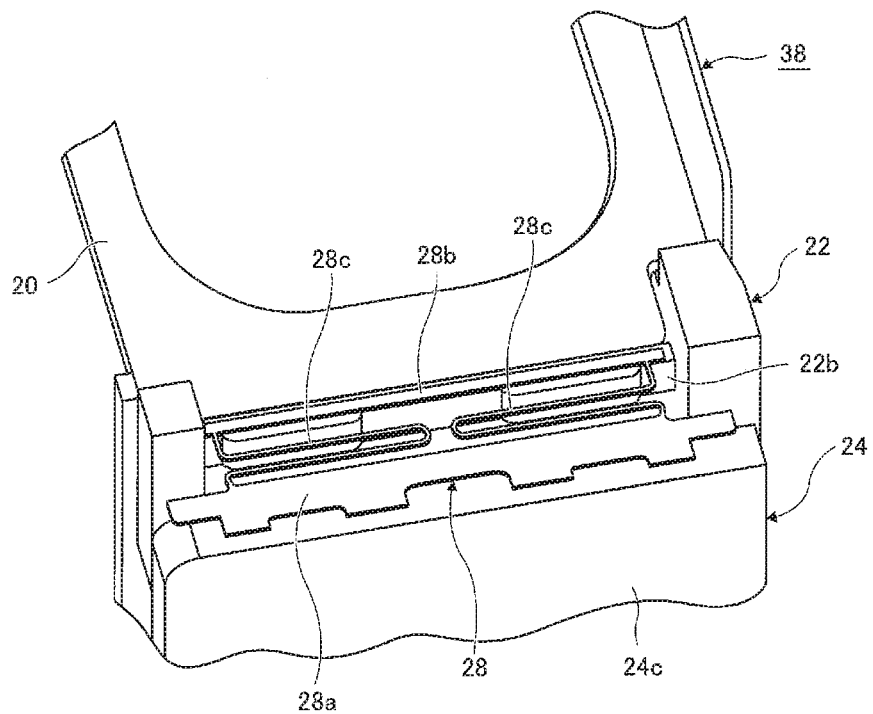
FIG. 7 shows a perspective view of upper leaf springs in the lens driving device according to the embodiment of the present invention.

A pair of upper leaf springs 28 is provided at both right and left sides. As shown in FIG. 7, each of the upper leaf spring 28 includes a main body side fixing portion 28a, a lens carrier side fixing portion 28b and two spring portions 28c. The main body side fixing portion 28a is fixed onto the upper end of the magnet 24. The lens carrier side fixing portion 28b is fixed onto the upper end of the coil mounting portion 22b of the main body 22 of the lens carrier. The spring portion 28c is formed as a wire shape with two bent portions and connects the main body side fixing portion 28a with the lens carrier side fixing portion 28b so as to exert an elastic force. The upper leaf springs 28, as a whole structure, include four spring portions 28c, thus the lens carrier 38 is supported at four perimeter places thereof. The upper leaf springs 28 are attached to the both lateral sides of the lens carrier 38 in a manner that surface of each upper leaf spring 28 is oriented orthogonal to the optical axis direction and they support the lens carrier 38 in a manner to freely move in the optical axis direction of the lens barrel 40 with respect to the lens driving device housing 34.

Figure 8:
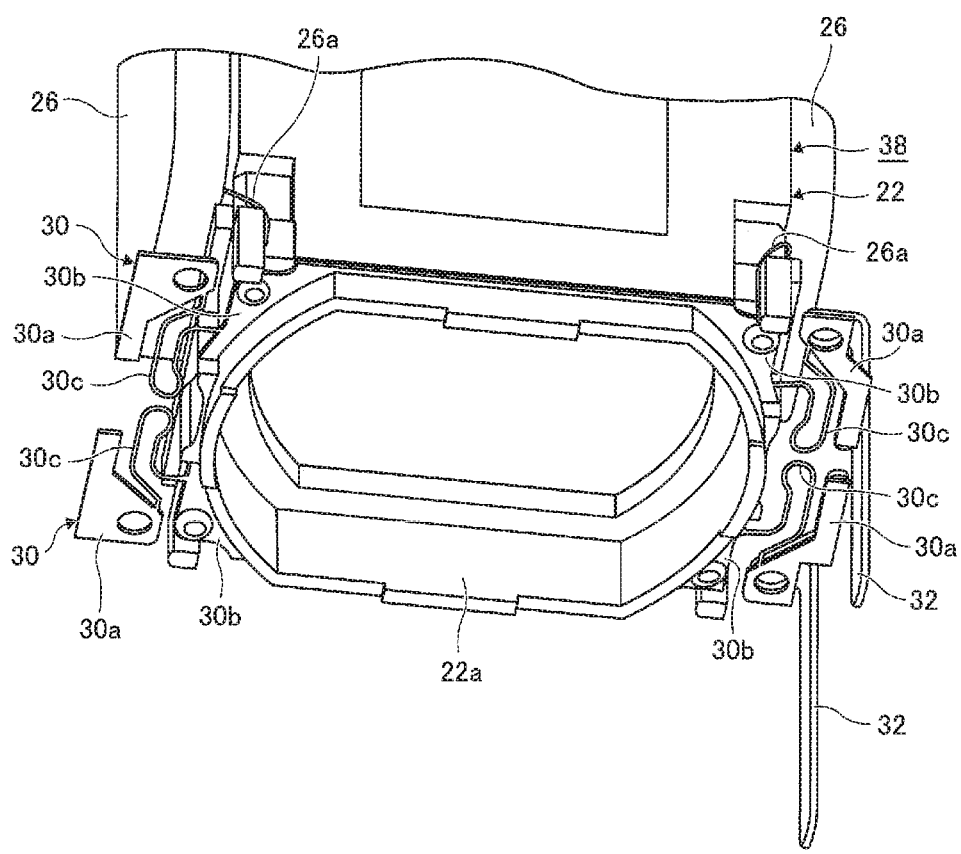
FIG. 8 shows a perspective view of the lower leaf springs in the lens driving device viewing from the lower side according to the embodiment of the present invention.

The lower leaf springs 30, as a whole structure, are divided into two parts in the forward-and-backward direction, and each lower leaf spring 30 has two spring members at the lateral ends thereof. The each lower leaf spring 30, as shown in FIG. 8, has two main body side fixing portions 30a, a lens carrier side fixing portion 30b and two spring portions 30c. The each main body side fixing portion 30a is fixed on to the upper end of the lower member 16. The lens carrier side fixing portion 30b is fixed on the bottom portion 22a of the main body 22 of the lens carrier. The each spring portion 30c is formed as a wire shape with two bent portions and connects the main body side fixing portion 30a with the lens carrier side fixing portion 30b so as to exert an elastic force. The lower leaf springs 30, as a whole structure, include four spring portions 30c, thus the lens carrier 38 is supported at four perimeter places thereof. The lower leaf springs 30 are attached to the both front and back sides and the both lateral sides of the lens carrier 38 in a manner that surface of each lower leaf spring 30 is oriented orthogonal to the optical axis direction and they support the lens carrier 38 in a manner to freely move in the optical axis direction of the lens barrel 40 with respect to the lens driving device housing 34.

Further, the lower leaf springs 30 are used as electro conductive members. As shown in FIG. 8, the ends 26a of the above-mentioned coils 26 are connected to the lens carrier side fixing portions 30b of the lower leaf springs 30 which are divided each other.

Two terminals 32 are connected to the main body side fixing portions 30a of the lower leaf springs 30 and are also fixed to the lower member 16 together with the main body side fixing portions 30a. These terminals 32 extend apart from the center of the lens barrel 40 toward the right direction, for example, and extend downward along the side surface of the lower member. An electric current input to one of the terminals 32 flows through the two coils 26 via one of the lower leaf springs 30 and output from the other one of the terminals 32 via the other one of the lower leaf springs 30. The coils 26 are electrically connected in parallel to the terminals 32.

A photo detecting sensor for receiving light which is passed through the lens barrel 40 via an IR filter is arranged below the lower member 16 so as to form a camera device.

In the camera device, the light incident to the prism 36 from an imaging target turns at right angle due to the effect of the prism 36 and is concentrated by the lens barrel 40 onto the photo detecting sensor so as to be detected thereby. A controller which is provided in the camera calculates a movement amount of the lens barrel 40 for focusing on the imaging target. The controller controls an electric voltage to be applied to the terminals 32 in a manner the voltage corresponds to the movement amount of the lens. When electric current flows through the coils 26 via the terminals 32 and the lower leaf springs 30, a magnetic flux from the magnets 24 acts on the coils 26, and an upward and downward moving force is generated in the coils 26. When the electromagnetic force is generated in the coils 26, the lens carrier 38 together with the lens barrel 40 moves against the counterforce of the upper leaf springs 28 and the lower leaf springs 30, thus the lens is focused on the imaging target.

As shown in the above embodiment, since there are not any obstacles obstructing the lens barrel 40 to be inserted into the lens carrier 38 in the front side thereof, it is easy to insert the lens barrel 40 into the lens carrier 38. However, the present invention is not limited to the above example. It can also be possible to form the opening 38a of the lens carrier 38 in a manner that the lens barrel 40 can be inserted from one of the lateral sides of the lens carrier 38 or the back side of the lens carrier 38. Further, the present invention is not limited to the examples in which the lens barrel 40 is inserted into the lens carrier 38 along the direction orthogonal to the optical axis direction of the lens barrel 40. It can also be possible to insert the lens barrel 40 thereto along any direction which intersects the optical axis direction of the lens barrel 40 at any angle; e.g. the lens barrel 40 can be inserted into the lens carrier 38 from a diagonal direction with respect to the optical axis direction. Further, in the above embodiment, the prism 36; i.e. the optical component forming an optical system which folds the optical axis is arranged on the optical axis direction. However, the present invention can be applied to other embodiments which do not include any optical component such as the one described above.

What is claimed is:

1. A lens driving device comprising:
   a box-shaped lens carrier having two opposing side walls for fixing a lens barrel to the inside of the two side walls;
   a driving unit for moving the lens carrier along an optical axis direction of the lens barrel; and
   an elastic supporter for supporting the lens carrier so as to move freely along the optical axis direction of the lens barrel; wherein
   the lens carrier has at least three openings defined between the two side walls, wherein two openings of the at least three openings open toward the optical axis direction, and at least another one opening of the at least three openings opens toward a direction intersecting the optical axis direction of the lens barrel and through which opening the lens barrel is inserted.

2. The lens driving device according to claim 1, further comprising an optical component arranged on the optical axis direction of the lens barrel, wherein
the optical component has a reflect surface for folding a light entered thereto.

3. The lens driving device according to claim 2, wherein the optical component has a front surface and a bottom surface, wherein
the optical component receives the light from the front surface and reflects the light outward from the bottom surface.

4. The lens driving device according to claim 1, wherein the opening opens toward a forward direction.

5. The lens driving device according to claim 1, further comprising a housing that directly faces the opening.

6. The lens driving device according to claim 5, wherein the housing has a cover that directly faces the opening.

7. The lens driving device according to claim 5, wherein the lens carrier has another opening on the opposite side of the opening through which another opening the lens barrel can directly face the housing.

8. The lens driving device according to claim 6, wherein the cover has a window through which a light enters.

9. A Camera device comprising:
a lens barrel;
a lens driving device; and
a photo detecting sensor that receives light passed through the lens barrel, wherein
the lens driving device includes:
  a box-shaped lens carrier having two opposing side walls for fixing a lens barrel to the inside of the two side walls;
  a driving unit for moving the lens carrier along the optical axis direction of the lens barrel; and
  an elastic supporter for supporting the lens carrier so as to move freely along the optical axis direction of the lens barrel; wherein
  the lens carrier has at least three openings defined between the two side walls, wherein two openings of the at least three openings open toward the optical axis direction, and at least another one opening of the at least three openings opens toward a direction intersecting the optical axis direction of the lens barrel and through which opening the lens barrel is inserted.

10. The camera device according to claim 9, wherein the lens driving device further includes an optical component that folds a light entered therethrough and is arranged on the optical axis direction of the lens barrel.

11. An electronic apparatus being equipped with a camera device including:
a lens barrel;
a lens driving device; and
a photo detecting sensor that receives light passed through the lens barrel, wherein
the lens driving device includes:
  a box-shaped lens carrier having two opposing side walls for fixing a lens barrel to the inside of the two side walls;
  a driving unit for moving the lens carrier along the optical axis direction of the lens barrel; and
  an elastic supporter for supporting the lens carrier so as to move freely along the optical axis direction of the lens barrel; wherein
  the lens carrier has at least three openings defined between the two side walls, wherein two openings of the at least three openings open toward the optical axis direction, and at least another one opening of the at least three openings opens toward a direction intersecting the optical axis direction of the lens barrel and through which opening the lens barrel is inserted.

12. The electronic apparatus according to claim 11, wherein the lens driving device further includes an optical component arranged on the optical axis direction of the lens barrel, wherein
the optical component has a reflect surface for folding a light entered thereto.

* * * * *